United States Patent
Reddy

(10) Patent No.: US 9,609,540 B2
(45) Date of Patent: Mar. 28, 2017

(54) METHOD AND APPARATUS FOR ESTIMATING LAG IN ANTENNA FEEDER CABLE OF WIRELESS TRANSMISSION SYSTEM

(71) Applicant: Alcatel-Lucent USA Inc., Murray Hill, NJ (US)

(72) Inventor: Ajit Reddy, Cliffwood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 83 days.

(21) Appl. No.: 14/754,859

(22) Filed: Jun. 30, 2015

(65) Prior Publication Data

US 2017/0006488 A1    Jan. 5, 2017

(51) Int. Cl.
    *H04L 7/00* (2006.01)
    *H04W 24/10* (2009.01)
    *H04W 24/00* (2009.01)

(52) U.S. Cl.
    CPC .................................. *H04W 24/10* (2013.01)

(58) Field of Classification Search
    None
    See application file for complete search history.

(56) References Cited

U.S. PATENT DOCUMENTS

| | | | | |
|---|---|---|---|---|
| 2006/0251181 A1* | 11/2006 | Shashidhar | ....... | H04L 25/03178 375/262 |
| 2009/0304104 A1* | 12/2009 | Le Saux | .............. | H04B 7/0434 375/267 |
| 2012/0190389 A1* | 7/2012 | Hui | ..................... | H03M 7/3073 455/500 |
| 2013/0163542 A1* | 6/2013 | Fettweis | ............. | H04W 72/044 370/329 |
| 2015/0071174 A1* | 3/2015 | Hui | ..................... | H03M 7/3073 370/328 |

* cited by examiner

*Primary Examiner* — Eunsook Choi
(74) *Attorney, Agent, or Firm* — Harness, Dickey & Pierce, P.L.C.

(57) ABSTRACT

A method includes transmitting, at a first time, a first transmission vector signal towards an antenna via a feeder cable connected to the antenna; receiving a first reflected vector signal, the first reflected vector signal being a reflection of the first transmission vector signal reflected from a point in the feeder cable; determining a first transformed transmission vector signal by performing a first vector forward transform on the first transmission vector signal; determining a first transformed reflected vector signal by performing a first vector forward transform on the first reflected vector signal; determining a first complex conjugate vector signal based on the first transmission vector signal and the first reflected vector signal; determining a first computed vector signal by performing a first vector inverse transform on the first complex conjugate vector signal; and determining a first sub-vector by performing a windowing function based on the first computed vector signal.

20 Claims, 2 Drawing Sheets

METHOD AND APPARATUS FOR ESTIMATING LAG IN ANTENNA FEEDER CABLE OF WIRELESS TRANSMISSION SYSTEM

BACKGROUND

1. Field

Example embodiments relate generally to wireless transmission systems, and particularly to estimating lag in a cable between a remote radio head and an antenna.

2. Related Art

Lag estimation methods can be used to measure lag based on an estimate of the arrival of the reflected signal upon the transmission of the wireless communication signal in a transmitter. The lag to be estimated may be the difference between the transmitted signal transmitted from a remote radio head (RRH) over an antenna feeder cable and the reflected signal received at the RRH due to the imperfections at the antenna end of the feeder cable. The lag can be measured by either measuring the phase of the reflected received wireless signal or directly measuring its arrival time. The estimation techniques of lag measurement can be classified into three classes as narrowband, wideband and ultra wide band (UWB).

The pseudo-noise (PN) sequence wideband signal has been used for estimation of the lag. In such a system, a signal coded by a known pseudo-noise (PN) sequence is transmitted by a transmitter. The received reflected signal is matched with the locally generated PN sequence. The lag between the transmitted and the received reflected signal is determined from the computed arrival time. In PN sequence systems because of the processing gain at the receiver, the PN sequence lag estimation systems perform much better than other systems in suppressing interference.

SUMMARY

According to at least some example embodiments, a method includes transmitting, at a first point in time, a first transmission vector signal towards an antenna via a feeder cable connected to the antenna; receiving a first reflected vector signal, the first reflected vector signal being a reflection of the first transmission vector signal reflected from a point in the feeder cable; determining a first transformed transmission vector signal by performing a first vector forward transform on the first transmission vector signal; determining a first transformed reflected vector signal by performing a first vector forward transform on the first reflected vector signal; determining a first complex conjugate vector signal based on the first transmission vector signal and the first reflected vector signal; determining a first computed vector signal by performing a first vector inverse transform on the first complex conjugate vector signal; and determining a first sub-vector by performing a windowing function based on the first computed vector signal.

The method may further include transmitting, at a second point in time, a second transmission vector signal towards an antenna via a feeder cable connected to the antenna; receiving a second reflected vector signal, the second reflected vector signal being a reflection of the second transmission vector signal reflected from a point in the feeder cable; determining a second transmission vector signal by performing a first vector forward transform on the second transmission vector signal; determining a second reflected vector signal by performing a first vector forward transform on the second reflected vector signal; determining a second complex conjugate vector signal based on the second transmission vector signal and the second reflected vector signal; determining a second computed vector signal by performing a first vector inverse transform on the second complex conjugate vector signal; and determining a second sub-vector signal by performing a windowing function based on the second computed vector signal.

The method may further include determining a first transformed vector signal by performing a vector forward transform on the first sub-vector signal; determining a first decomposition matrix based on the first transformed vector signal; determining a second transformed vector signal by performing a vector forward transform on the second sub-vector signal; and determining a second decomposition matrix based on the second transformed vector signal.

The method may further include determining a first vector of characteristic values $d_1$, and first characteristic vectors $V_1$ based on the first decomposition matrix; determining a first angular frequency of the first sub-vector signal based on the first characteristic vectors $V_1$; determining a second vector of characteristic values $d_2$, and second characteristic vectors $V_2$ based on the second decomposition matrix; and determining a second angular frequency of the second sub-vector signal based on the second characteristic vectors $V_2$.

The first angular frequency may be defined as $F_1(\omega)=e^H(\omega)V_{1N}V_{1N}{}^H e(\omega)$, the second angular frequency may be defined as $F_2(\omega)=e^H(\omega)V_{2N}V_{2N}{}^H e(\omega)$, $e(\omega)$ may be a complex valued vector in which the angular frequency $\omega$ is treated as a variable over the closed interval $[0,2\pi]$, the Hermitian transpose of $e(\omega)$ may be defined as $e^H(\omega)=[1, e^{j\omega}, \ldots e^{j(m-1)\omega}]$, $0\leq\omega\leq 2\pi$, N may be the length of vector forward transforms performed on the first and second sub-vector signals, and the method may further include determining a vector $$P_1(\omega) = \frac{1}{F_1(\omega)*d_1};$$

and determining a vector $$P_2(\omega) = \frac{1}{F_2(\omega)*d_2}.$$

The method may further include determining a magnitude value of the matrix $P_1(\omega)$; searching for peaks in the vector $P_2(\omega)$; determining a plurality of lag values based on the searched peaks and the determined magnitude; and selecting, as a valid lag value, at least one of the plurality of determined lag values.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
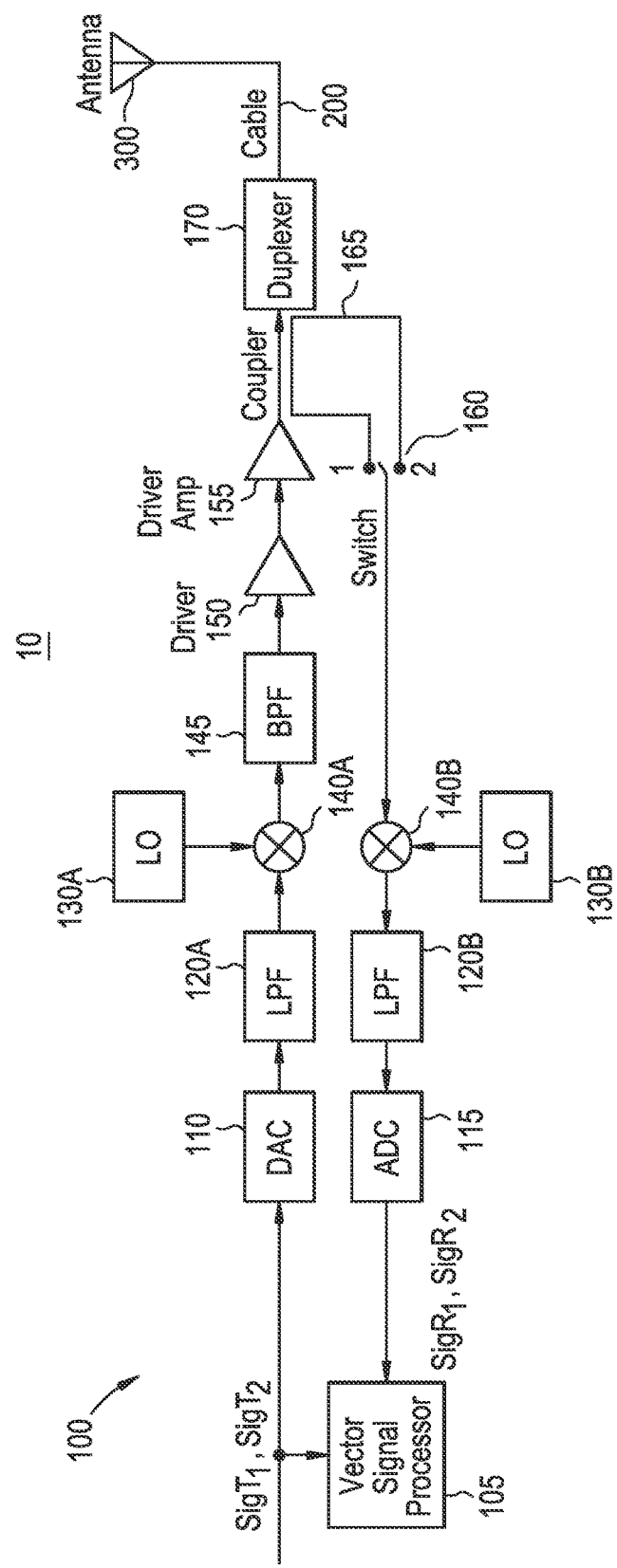
FIG. 1 is a diagram illustrating an example structure of a portion of a wireless communications system according to at least one example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits (ASICs), field programmable gate arrays (FPGAs), computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As is discussed above, lag estimation methods can be used to measure lag based on an estimate of the arrival of the reflected signal upon the transmission of the wireless communication signal in the transmitter. The pseudo-noise (PN) sequence wideband signal has been used for estimation of the lag. In such a system, a signal coded by a known pseudo-noise (PN) sequence is transmitted by a transmitter. The received reflected signal is matched with the locally generated PN sequence. The lag between the transmitted and the received reflected signal is determined from the computed arrival time. In PN sequence systems because of the processing gain at the receiver, the PN sequence lag estimation systems perform substantially better than some other systems in suppressing interference.

However in practical applications, due to the scarcity of the available bandwidth, the PN sequence lag estimation systems cannot provide a desirable level of accuracy. It may be desirable to implement estimation techniques with higher resolution to offset the scarcity of the available bandwidth to accurately estimate the lag in the presence of interference, noise and other antenna feeder cable impairments.

FIG. 1 is a diagram illustrating an example structure of a portion of a wireless communications system according to at least one example embodiment. Referring to FIG. 1, a wireless communications system 10 may include a remote radio head 100, an antenna feeder cable 200, and an antenna 300.

The antenna path with the feeder cable 200 and associated components such as diplexers, bias-T's, filters and tower mounted amplifiers (TMA's) can be represented by paths having real positive gains $g_k$, propagation delays $\tau_k$ and associated phase shifts $\theta_k$, where k is the path index and $\delta(.)$ is the Dirac delta function.

The complex low-pass antenna feeder path impulse response is given by equation (1) below:

$$h(t) = \sum_{k=1}^{N} g_k e^{j\theta_k} \delta(t - \tau_k), \quad (1)$$

where $|h(t)|^2$ is the power profile of the antenna feeder path impulse response.

Example Network Architecture

The architecture for antenna delay path estimation includes front end device (FED) which is a combination of mixed signal blocks or components are as shown in FIG. 1, which includes the antenna feeder cable to which the antenna is connected and the switching path for collecting the incident and reflected signal that is transmitted. Referring to FIG. 1, the FED may include, for example, the RRH 100 and the antenna feeder cable 200.

FIG. 1, shows the combination of blocks related to an RF front end (RF-FE) of the wireless communications system 10. The RF-FE may include the RRH 100, antenna feeder cable 200, and antenna 300. Referring to FIG. 1, the RRH 100 may include a digital to analog converter (DAC) 110, a first low-pass filter (LPF) 120A, an up-converter, which includes a first local oscillator 130A and a first mixer (e.g., multiplier) 140A, a band-pass filter (BPF) 145, a driver 150, a power amplifier (PA) 155, a coupler 165, a down-converter, which includes a second local oscillator 130B and a second mixer (e.g., multiplier) 140B, an analog to digital converter (ADC) 115, a vector signal processor (VSP) 105, and duplexer 170.

Figure 2:
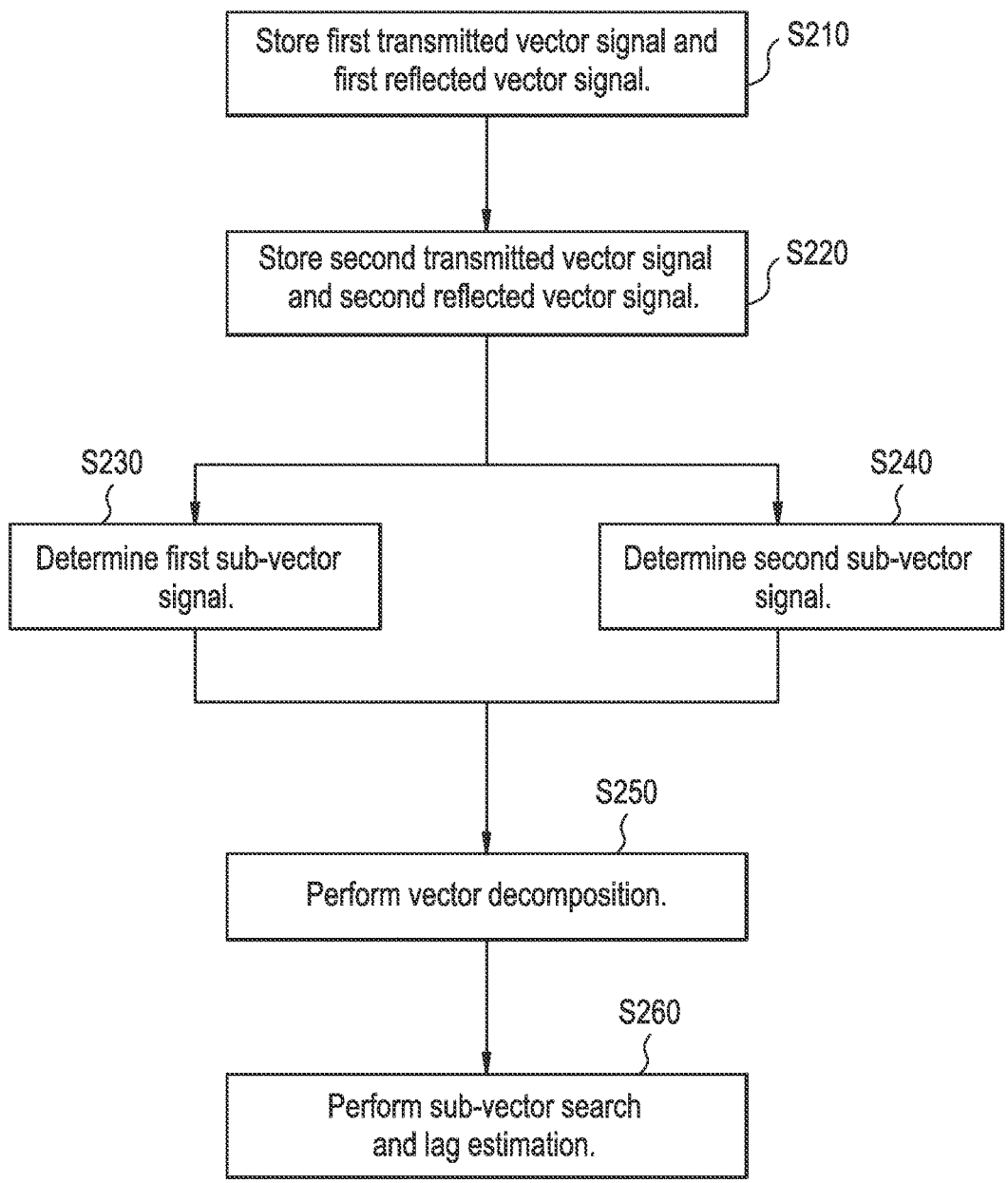
FIG. 2 is a flow chart illustrating an example method of estimating lag in an antenna feeder cable according to at least one example embodiment.

FIG. 2 is a flow chart illustrating an example method of estimating lag in an antenna feeder cable according to at least one example embodiment.

Referring to FIG. 2, in step S210, a first transmitted vector signal and first reflected vector signal are stored. For example, in step S210, the DAC 110 may receive a first transmission vector signal $SigT_1$ transmitted at first time point $t_1$, perform digital-to-analog conversion, and output the converted signal to the first LPF 120A. Further, as is illustrated in FIG. 1, first transmission vector signal $SigT_1$ is also be received by the VSP 105. The VSP 105 stores the first transmission vector signal $SigT_1$.

Further, in step S210 first LPF 120A may perform a first low pass filtering operation on the first transmission vector signal $SigT_1$, and output the filtered signal the first mixer 140A. The first mixer 140A may receive the low-pass filtered first transmission vector signal $SigT_1$ as well as the output of the first LO 130A, and perform an up-conversion operation on the low-pass filtered first transmission vector signal $SigT_1$ based on the output of the first LO 130A. The BPF 145 may receive the up-converted first transmission vector signal $SigT_1$ output by the first mixer 145A, perform a band-pass filtering operation on the up-converted first transmission vector signal $SigT_1$, and output the band-pass filtered first transmission vector signal $SigT_1$ to the driver 150. The driver 150 outputs the first transmission vector signal $SigT_1$ to the power amplifier 155, which amplifies the first transmission vector signal $SigT_1$ and outputs the amplified first transmission vector signal $SigT_1$ to the duplexer 170.

The duplexer 170 enables two-way transmission of signals with respect to the antenna feeder cable 200. In step S210, the duplexer 170 provides the amplified first transmission vector signal $SigT_1$ to the antenna 300 via the antenna feeder cable 200. The antenna feeder cable 200 may include one or more imperfections and/or discontinuities in between the RRH 100 and the antenna 300. The first transmission vector signal $SigT_1$ is incident on at least one of the one or more imperfections and/or discontinuities included in the antenna feeder cable 200, thereby creating a first reflected vector signal $SigR_1$, which travels back towards the RRH 100. The duplexer 170 receives the first reflected vector signal $SigR_1$.

Further, in step S210, the coupler 165 couples signals traveling in an opposite direction of the antenna 300 and output from the duplexer 170 to first and second nodes ('1' and '2') of a switch 160. The VSP 105 controls the switch 160 such that the switch is in a first position 1 in order for the switch 160 to receive the first reflected vector signal $SigR_1$. The switch 160 provides the first reflected vector signal $SigR_1$ to the second mixer 140B.

Further, in step S210, the second mixer 140B may receive the first reflected vector signal $SigR_1$ as well as the output of the second LO 130B, perform a down-conversion operation on the first reflected vector signal $SigR_1$ based on the output of the second LO 130B, and provide the down-converted first reflected vector signal $SigR_1$ to the second LPF 120B. The second LPF 120 may perform a low-pass filtering operation on the down-converted first reflected vector signal $SigR_1$, and provide the low-pass filtered first reflected vector signal $SigR_1$, to the ADC 115. The ADC 115 may perform an analog-to-digital conversion operation on the first reflected vector signal $SigR_1$, and provide the converted first reflected vector signal $SigR_1$ to the VSP 105. The VSP 105 may store the first reflected vector signal $SigR_1$ received from the ADC 115.

In step S220, a second transmitted vector signal and second reflected vector signal are stored. For example, in step S220, the DAC 110 may receive a second transmission vector signal $SigT_2$ transmitted at a second time point $t_2$, perform digital-to-analog conversion, and output the converted signal to the first LPF 120A. Further, as is illustrated in FIG. 1, second transmission vector signal $SigT_2$ is also be received by the VSP 105. The VSP 105 stores the second transmission vector signal $SigT_2$.

Further, in step S220 first LPF 120A may perform a first low pass filtering operation on the second transmission vector signal $SigT_2$, and output the filtered signal the first mixer 140A. The first mixer 140A may receive the low-pass filtered second transmission vector signal $SigT_2$ as well as the output of the first LO 130A, and perform an up-conversion operation on the low-pass filtered second transmission vector signal $SigT_2$ based on the output of the first LO 130A. The BPF 145 may receive the up-converted second transmission vector signal $SigT_2$ output by the first mixer 145A, perform a band-pass filtering operation on the up-converted the second transmission vector signal $SigT_2$, and output the band-pass filtered the second transmission vector signal $SigT_2$ to the driver 150. The driver 150 outputs the second transmission vector signal $SigT_2$ to the power amplifier 155, which amplifies the second transmission vector signal $SigT_2$ and outputs the amplified second transmission vector signal $SigT_2$ to the duplexer 170.

In step S220, the duplexer 170 provides the amplified second transmission vector signal $SigT_2$ to the antenna 300 via the antenna feeder cable 200. As is discussed above, the antenna feeder cable 200 may include one or more imperfections and/or discontinuities in between the RRH 100 and the antenna 300. The second transmission vector signal $SigT_2$ is incident on at least one of the one or more imperfections and/or discontinuities included in the antenna feeder cable 200, thereby creating a second reflected vector signal $SigR_2$, which travels back towards the RRH 100. The duplexer 170 receives the second reflected vector signal $SigR_2$.

Further, in step S220, the coupler 165 couples signals traveling in an opposite direction of the antenna 300 and output from the duplexer 170 to first and second nodes ('1' and '2') of a switch 160. In step S220, the VSP 105 controls the switch 160 such that the switch is in a second position 2 in order for the switch 160 to receive the second reflected vector signal $SigR_2$. The switch 160 provides the second reflected vector signal $SigR_2$ to the second mixer 140B.

Further, in step S220, the second mixer 140B may receive the second reflected vector signal $SigR_2$ as well as the output of the second LO 130B, perform a down-conversion operation on the second reflected vector signal $SigR_2$ based on the output of the second LO 130B, and provide the down-converted second reflected vector signal SigR$_2$ to the second LPF 120B. The second LPF 120 may perform a low-pass filtering operation on the down-converted second reflected vector signal SigR$_2$, and provide the low-pass filtered second reflected vector signal SigR$_2$, to the ADC 115. The ADC 115 may perform an analog-to-digital conversion operation on the second reflected vector signal SigR$_2$, and provide the converted second reflected vector signal SigR$_2$ to the VSP 105. The VSP 105 may store the second reflected vector signal SigR$_2$ received from the ADC 115.

Referring to step S210 and S220, the transmitted signals SigT$_1$ and SigT$_2$ are the forward vector data signals while the reflected signals SigR$_1$ and SigR$_2$ are the reverse vector data signals. In the examples architecture above with respect to FIGS. 1 and 2, the signal vectors SigT$_1$, SigT$_2$, SigR$_1$ and SigR$_1$ are complex.

Referring to FIG. 2, in step S230, a first sub-vector signal is determined. According to at least one example embodiment, in step S230, the VSP 105 determines a first sub-vector signal dVA$_1$. For example the VSP 105 may determine the first sub-vector signal dVA$_1$ in accordance with Algorithm 1 discussed below.

Algorithm 1
A1: $X_{T1}$=VFT(SigT$_1$)
A2: $X_{R1}$=VFT(SigR$_1$)
A3: $X_{P1}$=$X_{T1}$*conj($X_{R1}$)
A4: $V_{A1}$=VIT($X_{P1}$)
A5: $V_{M1}$=magnitude($V_{A1}$)
A6: $V_{R1}$=rotate ($V_{M1}$)
A7: $I_1$=peakindex($V_{R1}$)
A8: pivot=$I_1$
A9: dVA$_1$=$V_{A1}$ [pivot±svlen]

Algorithm 1 includes steps A1-A9. According to at least one example embodiment, steps A1-A9 are performed by the VSP 105.

In step A1, the VSP 105 performs a vector forward transform (VFT) operation on the first transmission vector signal SigT$_1$ to determine a first transformed transmission vector signal $X_{T1}$. In step A2, the VSP 105 performs a VFT operation on the first reflected vector signal SigR$_1$ to determine a first transformed reflected vector signal $X_{R1}$.

The VFT operations of steps A1 and A2 may be carried out using, for example, equation (2) or equation (3) provided below:

$$X(k) = \frac{1}{\sqrt{N}} \left[ \sum_{m=0}^{\frac{N}{2}-1} x(2m)U_{N/2}^{mk} + U_N^k \sum_{m=0}^{\frac{N}{2}-1} x(2m+1)U_{N/2}^{mk} \right], \quad (2)$$

$$X(k) = \frac{1}{\sqrt{N}} \left[ \sum_{m=0}^{\frac{N}{2}-1} x(2m)U_N^{2mk} + \sum_{m=0}^{\frac{N}{2}-1} x(2m+1)U_N^{(2m+1)k} \right], \quad (3)$$

where, with respect to equations (2) and (3), X(k) is an output vector signal of the VFT, x is an input vector signal of the VFT, U is a transform kernel, N is the length of vector forward transform, and m and k are an index variables.

In step A3, the VPU 105 generates a first complex conjugate vector signal $X_{P1}$, for example, by determining the complex conjugate of first transformed reflected vector signal $X_{R1}$, and multiplying the complex conjugate of the first transformed reflected vector signal $X_{R1}$ by the first transformed transmission vector signal $X_{T1}$.

In step A4, the VPU 105 generates a first computed vector signal $V_{A1}$, for example, by performing a vector inverse transform (VIT) operation on the first complex conjugate vector signal $X_{P1}$.

The VIT operation of step A4 may be performed using, for example, equation (4) or equation (5) provided below:

$$x(m) = \frac{1}{\sqrt{N}} \left[ \sum_{k=0}^{\frac{N}{2}-1} X(2k)U_{N/2}^{-mk} + U_N^{-k} \sum_{k=0}^{\frac{N}{2}-1} X(2k+1)U_{N/2}^{-mk} \right], \quad (4)$$

$$x(m) = \frac{1}{\sqrt{N}} \left[ \sum_{k=0}^{\frac{N}{2}-1} X(2k)U_N^{-2mk} + \sum_{k=0}^{\frac{N}{2}-1} X(2k+1)U_N^{-m(2k+1)} \right], \quad (5)$$

where, with respect to equations (4) and (5), x(m) is an output vector signal of the VFT, x is an input vector signal of the VFT, U is a transform kernel, N is the length of vector forward transform, and m and k is an index variables.

In step A5, the VPU 105 generates a first magnitude vector signal $V_{M1}$, by determining a magnitude of the first computed vector signal $V_{A1}$ in accordance with known methods.

In step A6, the VPU 105 generates a first rotated vector signal $V_{R1}$, by rotating the first magnitude vector signal $V_{M1}$ in accordance with known methods. The amount of rotation (e.g., in radians or degrees) may be determined empirically. For example, the rotation performed in step A6 may be performed in terms of time samples, which could also be translated into degrees/radians. The rotation can be adjusted to a desirable amount based on, for example, sampling frequency, signal vector length and the magnitude of the signal.

According to at least one example embodiment, the rotation is not determined a priori, and is determined only after the computation of the magnitude of the vector $V_{A1}$.

In step A7, the VPU 105 generates peak index value $I_1$, which is the peak value of the first rotated vector signal $V_{R1}$. The VPU 105 may determine the peak value of the first rotated vector signal $V_{R1}$ by performing a peak index operation in accordance with known methods.

In step A8, the VPU 105 sets the peak index value $I_1$ as a pivot value.

In step A9, the VPU 105 determines the first sub-vector signal dVA$_1$ by performing a windowing function on the first computed vector signal $V_{A1}$ in accordance with known methods. The windowing function is performed using the pivot value (i.e., $I_1$) and a value svlen as parameters such that dVA$_1$=$V_{A1}$[pivot±svlen]. The value svlen is an offset from the pivot value, and may be set to a desired value, for example, based on characteristics of the wireless communications system including, for example, a maximum time lead or lag.

Referring to FIG. 2, in step S240, a second sub-vector signal is determined. According to at least one example embodiment, in step S240, the VSP 105 determines a second sub-vector signal dVA$_2$. For example the VSP 105 may determine the second sub-vector signal dVA$_2$ in accordance with Algorithm 2 discussed below.

Algorithm 2
B1: $X_{T2}$=VFT(SigT$_2$)
B2: $X_{R2}$=VFT(SigR$_2$)
B3: $X_{P2}$=$X_{T2}$*conj($X_{R2}$)
B4: $V_{A2}$=VIT($X_{P2}$)
B5: $V_{M2}$=magnitude($V_{A2}$)

B6: $V_{R2}$=rotate ($V_{M2}$)
B7: pivot=$I_1$
B8: $dCA_2=V_{A2}$[pivot±svlen]

Algorithm 2 includes steps B1-B8. According to at least one example embodiment, steps B1-B8 are performed by the VSP 105.

In step B1, the VSP 105 performs a VFT operation on the second transmission vector signal $SigT_2$ to determine a second transformed transmission vector signal $X_{T2}$. In step B2, the VSP 105 performs a VFT operation on the second reflected vector signal $SigR_2$ to determine a second transformed reflected vector signal $X_{R2}$.

The VFT operations of steps B1 and B2 may be performed using, for example, equation (2) or equation (3) discussed above.

In step B3, the VPU 105 generates a second complex conjugate vector signal $X_{P2}$, for example, by determining the complex conjugate of second transformed reflected vector signal $X_{T1}$, and multiplying the complex conjugate of the second transformed reflected vector signal $X_{T1}$ by the second transformed transmission vector signal $X_{T2}$.

In step B4, the VPU 105 generates a second computed vector signal VA, for example, by performing a VIT operation on the second complex conjugate vector signal $X_{P2}$.

The VIT operation of step B4 may be carried out using, for example, equation (4) or equation (5) discussed above.

In step B5, the VPU 105 generates a second magnitude vector signal $V_{M2}$, by determining a magnitude of the second computed vector signal $V_{A2}$ in accordance with known methods.

In step B6, the VPU 105 generates a second rotated vector signal $V_{R2}$, by rotating the second magnitude vector signal $V_{M2}$ in accordance with known methods. The amount of rotation (e.g., in radians or degrees) may be determined empirically.

In step B7, the VPU 105 sets the peak index value $I_1$ (determined in step S230) as a pivot value.

In step B8, the VPU 105 determines the second sub-vector signal $dVA_2$ by performing a windowing function on the second computed vector signal $V_{A2}$ in accordance with known methods. The windowing function is performed using the pivot value (i.e., $I_1$) and a value svlen as parameters such that $dVA_2=V_{A2}$[pivot±svlen]. As is discussed above with reference to step S230, the value svlen is an offset from the pivot value, and may be set to a desired value, for example, based on characteristics of the wireless communications system including, for example, a maximum time lead or lag.

In step S250, vector decomposition is performed based on the first and second sub-vector signals. According to at least one example embodiment, in step S250, the VSP 105 performs the vector decomposition based on first and second sub-vector signals $dVA_1$ and $dVA_2$ determined in steps S230 and S240, respectively. For example the VSP 105 may perform the vector decomposition of step S250 in accordance with Algorithm 3 discussed below.

Algorithm 3

C1: $H_1$ = VFT($dVA_1$)
C2: $H_2$ = VFT($dVA_2$)
C3: $R_1$ = E[$X_1 X_1^H$]
C4: $R_2$ = E[$X_2 X_2^H$]
C5: [$d_1$, $V_1$] = vsig_decomp($R_1$)
C6: $d_1$ = order($d_1$)
C7: $V_1$ = order($V_1$)
C8: [$d_2$, $V_2$] = vsig_decomp($R_2$)

Algorithm 3 (continued)

C9: $d_2$ = order($d_2$)
C10: $V_2$ = order($V_2$)
C11: $F_1(\omega)$ = vsig_func($V_1$, $e(\omega)$)
C12: $F_2(\omega)$ = vsig_func($V_2$, $e(\omega)$)

C13: $P_1(\omega) = \dfrac{1}{F_1(\omega) * d_1}$

C14: $P_2(\omega) = \dfrac{1}{F_2(\omega) * d_2}$

Algorithm 3 includes steps C1-C14. According to at least one example embodiment, steps C1-C14 are performed by the VSP 105.

In step C1, the VSP 105 performs a VFT operation on the first sub-vector signal $dVA_1$ to determine a first vector $H_1$. In step C2, the VSP 105 performs a VFT operation on the second sub-vector signal $dVA_2$ to determine a second vector $H_2$.

The VFT operations of steps C1 and C2 may be performed using, for example, equation (2) or equation (3) discussed above. According to at least one example embodiment, first and second vectors may be defined by equations (6) and (7) below.

$$H_1 = [a_1, a_2, a_3 \ldots a_n] \qquad (6)$$

$$H_2 = [b_1, b_2, b_3 \ldots b_n] \qquad (7)$$

Further, the VSP 105 may determine a first symmetric data matrix $X_1$ based on first vector $H_1$ in accordance with equation (8), and determine a second symmetric data matrix $X_2$ based on second vector $H_2$ in accordance with equation (9).

$$X_1 = \begin{bmatrix} a_m & \cdots & a_3 a_2 a_1 \\ a_{m+1} a_m & \cdots & a_4 a_3 a_2 \\ a_{m+2} a_{m+1} a_m & \cdots & a_5 a_4 a_3 \\ & & \vdots \\ a_{2m-1} a_{2m-2} & \cdots & a_{m+1} a_m \end{bmatrix} \qquad (8)$$

$$X_2 = \begin{bmatrix} b_m & \cdots & b_3 b_2 b_1 \\ b_{m+1} b_m & \cdots & b_4 b_3 b_2 \\ b_{m+2} b_{m+1} b_m & \cdots & b_5 b_4 b_3 \\ & & \vdots \\ b_{2m-1} b_{2m-2} & \cdots & b_{m+1} b_m \end{bmatrix} \qquad (9)$$

With respect to equations (8) and (9), $m=2N_s$ and $N_s$ is the number of sources (i.e., a desired number of peak sources to be identified during the lag estimation).

In step C3, the VSP 105 determines a first decomposition matrix R1, for example, based on an expectation value of the product of the first matrix $X_1$ and the Hermitian transpose of the first matrix $X_1$ (e.g., E[$X_1 X_1^H$]). The first decomposition matrix R1 is defined, for example, by equations (10) and (12) below. In step C4, the VSP 105 determines a second decomposition matrix R2, for example, based on an expectation value of the product of the second matrix $X_2$ and the Hermitian transpose of the second matrix $X_2$ (e.g., E[$X_2 H_2^H$]). The second decomposition matrix R2 is defined, for example, by equations (11) and (13) below. Referring to equations (10)-(13), decomposition matrices $R_1$ and $R_2$ are then formed from the symmetric data matrices $X_1$ and $X_2$, H refers to a conjugate transpose or Hermitian transpose, $\sigma_1^2$ and $\sigma_2^2$ are characteristic values, and I is the identify matrix.

$$R_1 = E[X_1 X_1^H] \quad (10)$$

$$R_2 = E[X_2 X_2^H] \quad (11)$$

$$R_1 = V_1 A_1 V_1^H + \forall \sigma_1^2 I, A_1 = E[a_1 a_1^H] \quad (12)$$

$$R_2 = V_2 A_2 V_2^H + \forall \sigma_2^2 I, A_2 = E[a_2 a_2^H] \quad (13)$$

In step C5, the VSP 105 performs a decomposition operation (vsig_decomp($R_1$)) on the first decomposition vector R1 to obtain the first vector of characteristic values $d_1$ and the first characteristic vectors $V_1$ for the first vector $H_1$.

In step C6, the VSP 105 performs an ordering function (order($d_1$)) on the first vector of characteristic values $d_1$. The ordering function orders the elements of the first vector of characteristic values $d_1$ from minimum to maximum values.

In step C7, the VSP 105 performs an ordering function (order($V_1$)) on the first characteristic vectors $V_1$. The ordering function orders the elements of the characteristic vectors $V_1$ from minimum to maximum values.

In step C8, the VSP 105 performs a decomposition operation (vsig_decomp($R_2$)) on the second decomposition vector $R_2$ to obtain the second vector of characteristic values $d_2$ and the second characteristic vectors $V_2$ for the second vector $H_2$.

In step C9, the VSP 105 performs an ordering function (order($d_2$)) on the second vector of characteristic values $d_2$. The ordering function orders the elements of the second vector of characteristic values $d_2$ from minimum to maximum values.

In step C10, the VSP 105 performs an ordering function (order($V_2$)) on the second vector of characteristic values $d_2$. The ordering function orders the elements of the second characteristic vectors $V_2$ from minimum to maximum values.

In step C11, the VSP 105 determines an angular frequency of the first sub-vector signal $dVA_1$ (e.g., $F_1(\omega)$). For example, the VSP 105 may determine a frequency searching vector $e(\omega)$, which is a complex valued angular frequency vector in which the angular frequency $\omega$ is treated as a variable over the closed interval $[0, 2\pi]$. The Hermitian transpose of $e(\omega)$, $e^H(\omega)$, is defined by equation 14 below.

$$e^H(\omega) = [1, e^{j\omega}, \ldots e^{j(m-1)\omega}], 0 \leq \omega \leq 2\pi \quad (14)$$

Accordingly the VSP 105 may determine angular frequency of the first sub-vector signal $dVA_1$ in accordance with the function $F_1(\omega)$, which is defined by equations (15) and (16) below. Equations (15) and (16) below may also be referred to using the following function notation: $F_1(\omega) = \text{vsig\_func}(V_1, e(\omega))$.

$$F_1(\omega) = \sum_{i=Ns+1}^{m} e^H(\omega) V_{1i} V_{1i}^H e(\omega) \quad (15)$$

$$F_1(\omega) = e^H(\omega) V_{1N} V_{1N}^H e(\omega) \quad (16)$$

In step C12, the VSP 105 determines an angular frequency of the second sub-vector signal $dVA_2$ (e.g., $F_2(\omega)$). For example, the VSP 105 may determine angular frequency of the second sub-vector signal $dVA_2$ in accordance with the function $F_2(\omega)$, which is defined by equations (17) and (18) below. Equations (17) and (18) below may also be referred to using the following function notation: $F_2(\omega) = \text{vsig\_func}(V_2, e(\omega))$.

$$F_2(\omega) = \sum_{i=Ns+1}^{m} e^H(\omega) V_{2i} V_{2i}^H e(\omega) \quad (17)$$

$$F_2(\omega) = e^H(\omega) V_{2N} V_{2N}^H e(\omega) \quad (18)$$

In step C13, the VSP 105 determines a vector $P_1(\omega)$ in accordance with equation (19) below.

$$P_1(\omega) = \frac{1}{F_1(\omega) * d_1} \quad (19)$$

In step C14, the VSP 105 determines a vector $P_2(\omega)$ in accordance with equation (20) below.

$$P_2(\omega) = \frac{1}{F_2(\omega) * d_2} \quad (20)$$

In step S260, a vector search and lag estimation are performed, for example, based on the results of the vector decomposition in step S250. According to at least one example embodiment, in step S260, the VSP 105 performs a vector search operation and lag estimation based on vectors $P_1(\omega)$ and $P_2(\omega)$ determined in step S250. For example the VSP 105 may perform the vector search and lag estimation of step S260 in accordance with Algorithm 4 discussed below.

Algorithm 4
D1: $M_1$ = magnitude ($P_1(\omega)$)
D2: Searching for the peaks $pk_1, pk_2, \ldots pk_n$, in the sub-vector $P_2(\omega)$
D3: Compute the lags $lag_1, lag_2, \ldots lag_n$ from $M_1$ to the corresponding peaks $pk_1, pk_2, \ldots pk_n$
D4: Determine the valid lag from the antenna end in the antenna feeder cable Algorithm 4 includes steps D1-D4. According to at least one example embodiment, steps D1-D4 are performed by the VSP 105.

In step D1, the VSP 105 determines magnitude vector $M_1$ by determining the magnitude of vector $P_1(\omega)$.

In step D2, the VSP 105 searches the peaks $pk_1, pk_2, \ldots pk_n$ in the sub-vector $P_2(\omega)$ In step D3, the VSP 105 computes lag values $lag_1, lag_2, \ldots lag_n$ from $M_1$ to the corresponding peaks $pk_1, pk_2, \ldots pk_n$.

In step D4, the VSP 105 determines the valid lag from the antenna end in the antenna feeder cable. For example, the VSP 105 may select one of the lag values determined in step D3 as the valid lag. The valid lag may be chosen from among the lag values determined in step D3, for example, in accordance with the preferences of an operator of the wireless communications system 10 or the RRH 100.

According to at least one example embodiment, the VSP 105 may be programmed, in terms of software and/or hardware, to perform any or all of the functions described herein as being performed by the VSP 105. Consequently, the VSP 105 may be embodied as a special purpose computer.

Examples of the VSP 105 being programmed, in terms of software, to perform any or all of the functions described herein as being performed by the VSP 105 will now be discussed below. For example, the VSP 105 may include a volatile and/or non-volatile storage that stores one or more programs including executable instructions corresponding to any or all of the operations described herein (e.g., with reference to FIGS. 1-2) as being performed by the VSP 105. According to at least one example embodiment, additionally or alternatively to being stored in the storage of the VSP 105, the executable instructions may be stored in a computer-readable medium including, for example, an optical disc, flash drive, SD card, etc., and the VSP 105 may include hardware for reading data stored on the computer readable-medium. Further, the VSP 105 may be a processor configured to perform any or all of the operations described herein (e.g., with reference to FIGS. 1-2) as being performed by the VSP 105, for example, by reading and executing the stored executable instructions.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA).

Examples of the VSP 105 being programmed, in terms of hardware, to perform any or all of the functions described herein as being performed by a user, a cache, or server will now be discussed below. Additionally or alternatively to executable instructions corresponding to the functions described herein as being performed by the VSP 105 being stored in a memory unit or a computer-readable medium as is discussed above, the VSP 105 may include one or more circuits that have structural designs dedicated to performing any or all of the operations described herein (e.g., with reference to FIGS. 1-2) as being performed by the VSP 105. For example, the above-referenced one or more circuits included in the VSP 105 may be FPGAs or ASICs physically programmed to perform any or all of the operations described with reference to FIGS. 1-2 as being performed by the VSP 105.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method comprising:
    transmitting, at a first point in time, a first transmission vector signal towards an antenna via a feeder cable connected to the antenna;
    receiving a first reflected vector signal, the first reflected vector signal being a reflection of the first transmission vector signal reflected from a point in the feeder cable;
    determining a first transformed transmission vector signal by performing a first vector forward transform on the first transmission vector signal;
    determining a first transformed reflected vector signal by performing a first vector forward transform on the first reflected vector signal;
    determining a first complex conjugate vector signal based on the first transmission vector signal and the first reflected vector signal;
    determining a first computed vector signal by performing a first vector inverse transform on the first complex conjugate vector signal; and
    determining a first sub-vector by performing a windowing function based on the first computed vector signal.

2. The method of 1, wherein the first vector forward transform is defined by the following equation, $$X(k) = \frac{1}{\sqrt{N}}\left[\sum_{m=0}^{\frac{N}{2}-1} x(2m)U_{N/2}^{mk} + U_N^k \sum_{m=0}^{\frac{N}{2}-1} x(2m+1)U_{N/2}^{mk}\right],$$

wherein X(k) is an output vector signal of the first vector forward transform, x is an input vector signal of the first vector transform, U is a transform kernel, N is a length of the first vector forward transform, and m and k are index variables.

3. The method of 1, wherein the first vector forward transform is defined by the following equation, $$X(k) = \frac{1}{\sqrt{N}}\left[\sum_{m=0}^{\frac{N}{2}-1} x(2m)U_N^{2mk} + \sum_{m=0}^{\frac{N}{2}-1} x(2m+1)U_N^{(2m+1)k}\right],$$

wherein X(k) is an output vector signal of the first vector forward transform, x is an input signal of the first vector transform, U is a transform kernel, N is a length of the first vector forward transform, and m and k are index variables.

4. The method of 1, wherein the first vector inverse transform is defined by the following equation, $$x(m) = \frac{1}{\sqrt{N}}\left[\sum_{k=0}^{\frac{N}{2}-1} X(2k)U_{N/2}^{-mk} + U_N^{-k} \sum_{k=0}^{\frac{N}{2}-1} X(2k+1)U_{N/2}^{-mk}\right],$$

wherein x(m) is an output vector signal of the first vector inverse transform, X is the first complex conjugate vector, U is a transform kernel, N is a length of the first vector inverse transform, and m and k are index variables.

5. The method of 1, wherein the first vector inverse transform is defined by the following equation, $$x(m) = \frac{1}{\sqrt{N}}\left[\sum_{k=0}^{\frac{N}{2}-1} X(2k)U_N^{-2mk} + \sum_{k=0}^{\frac{N}{2}-1} X(2k+1)U_N^{-m(2k+1)}\right],$$

wherein x(m) is an output vector of the first vector inverse transform, X is the first complex conjugate vector, U is a transform kernel, N is a length of the first vector inverse transform, and m and k are index variables.

6. The method of 1, further comprising:
    transmitting, at a second point in time, a second transmission vector signal towards an antenna via a feeder cable connected to the antenna;
    receiving a second reflected vector signal, the second reflected vector signal being a reflection of the second transmission vector signal reflected from a point in the feeder cable;
    determining a second transmission vector signal by performing a first vector forward transform on the second transmission vector signal;

determining a second reflected vector signal by performing a first vector forward transform on the second reflected vector signal;

determining a second complex conjugate vector signal based on the second transmission vector signal and the second reflected vector signal;

determining a second computed vector signal by performing a first vector inverse transform on the second complex conjugate vector signal; and determining a second sub-vector signal by performing a windowing function based on the second computed vector signal.

7. The method of 6, wherein the second vector forward transform is defined by the following equation, $$X(k) = \frac{1}{\sqrt{N}} \left[ \sum_{m=0}^{\frac{N}{2}-1} x(2m) U_{N/2}^{mk} + U_N^k \sum_{m=0}^{\frac{N}{2}-1} x(2m+1) U_{N/2}^{mk} \right],$$

wherein X(k) is an output vector of the second vector forward transform, x is an input signal of the second vector transform, U is a transform kernel, N is a length of second vector forward transform, and m and k are index variables.

8. The method of 6, wherein the second vector forward transform is defined by the following equation, $$X(k) = \frac{1}{\sqrt{N}} \left[ \sum_{m=0}^{\frac{N}{2}-1} x(2m) U_N^{2mk} + \sum_{m=0}^{\frac{N}{2}-1} x(2m+1) U_N^{(2m+1)k} \right],$$

wherein X(k) is an output vector of the second vector forward transform, x is an input signal of the second vector transform, U is a transform kernel, N is a length of the second vector forward transform, and m and k are index variables.

9. The method of 6, wherein the first vector inverse transform is defined by the following equation, $$x(m) = \frac{1}{\sqrt{N}} \left[ \sum_{k=0}^{\frac{N}{2}-1} X(2k) U_{N/2}^{-mk} + U_N^{-k} \sum_{k=0}^{\frac{N}{2}-1} X(2k+1) U_{N/2}^{-mk} \right],$$

wherein x(m) is an output vector of the second vector inverse transform, X is the second complex conjugate vector, U is a transform kernel, N is a length of the second vector inverse transform, and m and k are index variables.

10. The method of 6, wherein the first vector inverse transform is defined by the following equation, $$x(m) = \frac{1}{\sqrt{N}} \left[ \sum_{k=0}^{\frac{N}{2}-1} X(2k) U_N^{-2mk} + \sum_{k=0}^{\frac{N}{2}-1} X(2k+1) U_N^{-m(2k+1)} \right],$$

wherein x(m) is an output vector of the second vector inverse transform, X is the second complex conjugate vector, U is a transform kernel, N is a length of the second vector inverse transform, and m and k are index variables.

11. The method of claim 6, further comprising:
determining a first transformed vector signal by performing a vector forward transform on the first sub-vector signal;
determining a first decomposition matrix based on the first transformed vector signal;
determining a second transformed vector signal by performing a vector forward transform on the second sub-vector signal; and
determining a second decomposition matrix based on the second transformed vector signal.

12. The method of claim 11, further comprising:
determining a first vector of characteristic values $d_1$, and first characteristic vectors $V_1$ based on the first decomposition matrix;
determining a first angular frequency of the first sub-vector signal based on the first characteristic vectors $V_1$;
determining a second vector of characteristic values $d_2$, and second characteristic vectors $V_2$ based on the second decomposition matrix; and
determining a second angular frequency of the second sub-vector signal based on the second characteristic vectors $V_2$.

13. The method of claim 12, wherein,
the first angular frequency is defined as $F_1(\omega) = e^H(\omega) V_{1N} V_{1N}^H e(\omega),$ the second angular frequency is defined as $F_2(\omega) = e^H(\omega) V_{2N} V_{2N}^H e(\omega),$ e(ω) is a complex valued vector in which the angular frequency ω is treated as a variable over the closed interval [0,2π], the Hermitian transpose of e(ω) is defined as $e^H(\omega) = [1, e^{j\omega}, \ldots, e^{j(m-1)\omega}], 0 \le \omega \le 2\pi,$ N is the length of vector forward transforms performed on the first and second sub-vector signals, and
the method further comprises:
determining a vector $$P_1(\omega) = \frac{1}{F_1(\omega) * d_1};$$

and
determining a vector $$P_2(\omega) = \frac{1}{F_2(\omega) * d_2}.$$

14. The method of claim 13, further comprising:
determining a magnitude value of the matrix $P_1(\omega)$;
searching for peaks in the vector $P_2(\omega)$;
determining a plurality of lag values based on the searched peaks and the determined magnitude; and
selecting, as a valid lag value, at least one of the plurality of determined lag values.

15. A remote radio head comprising:
a feeder cable connected to an antenna, the feeder cable being configured to transmit, at a first point in time, a first transmission vector signal towards the antenna; and
a vector signal processor, the vector signal processor being configured to,
  receive the first transmission vector signal,
  receive a first reflected signal, the first reflected signal being a reflection of the first transmission vector signal reflected from a point in the feeder cable,
  determine a first transmission vector signal by performing a first vector forward transform on the first transmission vector signal,
  determine a first reflected vector signal by performing a first vector forward transform on the first reflection signal,
  determine a first complex conjugate vector based on the first transmission vector signal and the first reflected vector signal,
  determine a first computed vector by performing a first vector inverse transform on the first complex conjugate vector, and
  determine a first sub-vector by performing a windowing function based on the first computed vector signal.

16. The remote radio head of claim 15, wherein the vector signal processor is further configured to,
  transmit, at a second point in time, a second transmission vector signal towards an antenna via a feeder cable connected to the antenna,
  receive a second reflected signal, the second reflected signal being a reflection of the second transmission reflected from a point in the feeder cable,
  determine a second transmission vector signal by performing a first vector forward transform on the second transmission vector signal,
  determine a second reflected vector signal by performing a first vector forward transform on the second reflection signal,
  determine a second complex conjugate vector based on the second transmission vector signal and the second reflected vector signal,
  determine a second computed vector signal by performing a first vector inverse transform on the second complex conjugate vector, and
  determine a second sub-vector by performing a windowing function based on the second computed vector signal.

17. The remote radio head of claim 16, wherein the vector signal processor is further configured to,
  determine a first transformed vector signal by performing a vector forward transform on the first sub-vector signal,
  determine a first decomposition matrix based on the first transformed vector signal,
  determine a second transformed vector signal by performing a vector forward transform on the second sub-vector signal, and
  determine a second decomposition matrix based on the second transformed vector signal.

18. The remote radio head of 17, wherein the vector signal processor is further configured to,
  determine a first vector of characteristic values $d_1$, and first characteristic vectors $V_1$ based on the first decomposition matrix,
  determine a first angular frequency of the first sub-vector signal based on the first characteristic vectors $V_1$,
  determine a second vector of characteristic values $d_2$, and second characteristic vectors $V_2$, based on the second decomposition matrix, and
  determine a second angular frequency of the second sub-vector signal based on the second characteristic vectors $V_2$.

19. The remote radio head of claim 18, wherein the vector signal processor is configured such that,
  the first angular frequency is defined as
  $$F_1(\omega)=e^H(\omega)V_{1N}V_{1N}^H e(\omega),$$
  the second angular frequency is defined as
  $$F_2(\omega)=e^H(\omega)V_{2N}V_{2N}^H e(\omega),$$
  $e(\omega)$ is a complex valued vector in which the angular frequency $\omega$ is treated as a variable over the closed interval $[0,2\pi]$,
  the Hermitian transpose of $e(\omega)$ is defined as
  $$e^H(\omega)=[1,e^{j\omega},\ldots e^{j(m-1)\omega}], 0\le\omega\le 2\pi,$$
  N is the length of vector forward transforms performed on the first and second sub-vector signals, and
  the vector signal processor is further configured to:
    determine a vector
    $$P_1(\omega) = \frac{1}{F_1(\omega)*d_1},$$
    and
    determine a vector
    $$P_2(\omega) = \frac{1}{F_2(\omega)*d_2}.$$

20. The remote radio head of claim 19, wherein the vector signal processor is further configured to,
  determine a magnitude value of the matrix $P_1(\omega)$m
  search for peaks in the vector $P_2(\omega)$m
  determine a plurality of lag values based on the searched peaks and the determined magnitude, and
  select, as a valid lag value, at least one of the plurality of determined lag values.

* * * * *